United States Patent [19]

Ando et al.

[11] Patent Number: 4,904,421

[45] Date of Patent: Feb. 27, 1990

[54] SOFT OCULAR LENS AND METHOD FOR ITS PREPARATION

[75] Inventors: Ichiro Ando; Toru Kawaguchi, both of Nagoya, Japan

[73] Assignee: Tomei Sangyo Kabushiki Kaisha, Nagoya, Japan

[21] Appl. No.: 119,540

[22] Filed: Nov. 12, 1987

[51] Int. Cl.$^4$ .............................................. B29D 11/00
[52] U.S. Cl. ...................................... 264/2.6; 264/344; 523/106; 525/192; 525/198; 525/932; 525/937
[58] Field of Search ................ 264/344, 2.6; 528/491; 523/106

[56] References Cited

U.S. PATENT DOCUMENTS 3,819,782  6/1974  Irie .
4,401,797  8/1983  Gallop ............................ 523/106

FOREIGN PATENT DOCUMENTS 137686   4/1985  European Pat. Off. .
2463795  2/1981  France .
1412439  11/1975 United Kingdom .

*Primary Examiner*—Jacob Ziegler
*Attorney, Agent, or Firm*—Oblon, Spivak, McClelland, Maier & Neustadt

[57] ABSTRACT

A method for preparing a soft ocular lens, which comprises machining a machinably hard polymer blend body composed essentially of a soft lens material and a hard polymer into an ocular lens shape, and removing the hard polymer from the shaped product.

8 Claims, 1 Drawing Sheet

SOFT OCULAR LENS AND METHOD FOR ITS PREPARATION

The present invention relates to a soft ocular lens and a method for its preparation. More particularly, it relates to a soft ocular lens such as a soft contact lens, intraocular lens or artificial cornea, which requires highly precise machining of a soft lens material in its preparation, and a method particularly useful for the preparation of such a soft ocular lens.

Among various materials for ocular lenses, a water-absorptive soft ocular lens material composed essentially of poly(2-hydroxyethyl methacrylate) or poly(N-vinylpyrrolidone) has attracted an attention in recent years since it gives a comfortable feeling to the wearer and good compatibility to the cornea by its nature such that it swells and softens upon absorption of water.

However, when such a material capable of being softened by water is used, for example, as a soft contact lens, it has the following drawbacks:

(a) Because of the water-absorptivity, excreta in the tear tend to accumulate in the interior of the contact lens, which often leads to a serious trouble to the eye.

(b) Bacteria are likely to propagate on the lens penetrate into the lens, and cumbersome precautions are required for its use and storage, including periodical sterilization by boiling and so on.

Under the circumstances, it has been proposed in this field to use a soft ocular lens material having no or little water-absorptivity for an ocular lens such as a soft contact lens, in order to overcome the above-mentioned drawbacks of the soft contact lens without impairing the merit of giving a comfortable feeling to the wearer. In general, a material capable of being softened by water has a relatively high glass transition temperature and is hard enough to be worked by conventional machining, for example, lathe cutting technique when it contains no water. Therefore, it is common to employ a method wherein the material is machined in the no water-containing state into a desired shape, followed by being softened by water to obtain an ocular lens such as a contact lens. On the other hand, a soft ocular lens material having no or little water absorptivity has a low glass transition temperature and is soft at room temperature, and it has been difficult or impossible to work it by machining.

Methods which have been proposed for the preparation of ocular lenses such as contact lenses by using such a water-nonabsorptive soft ocular lens material, may be classified generally into the following two methods.

(1) A method wherein the soft ocular lens material is cooled to be hardened and then worked by machining (Japanese Examined Patent Publications No. 13583/1981 and No. 53569/1982).

(2) A molding method wherein a monomer for a soft ocular lens material is poured into a mold, followed by polymerization to obtain a molded product, or wherein an oligomer such as a urethane precursor, a silicone precursor or a liquid rubber is poured into a mold, followed by polymerization or curing to obtain a molded product.

The above machining method (1) requires a substantial installation for the cooling of the soft lens material, which is costly and not economical. Besides, there is an additional problem that when cooled, the soft lens material tends to be brittle and hardly workable by machining.

On the other hand, the molding method (2) has problems such that when a monomer is poured into a mold, followed by polymerization to obtain a molded product, shrinkage is likely to take place during the polymerization, and the resulting molded product tends to frequently have distortion or unevenness, whereby it is difficult to obtain a molded product having a desired shape, and a number of molds of various specifications are required for mass production. Further, when a volatile material is used as the monomer, a part of the monomer is likely to evaporate during the polymerization, whereby it is difficult to obtain a molded product having a desired shape.

In the case where a molded product is produced by a method wherein an oligomer is poured into a mold, followed by curing to obtain a molded product, volume shrinkage is likely to take place during the curing, whereby it is difficult to obtain a molded product having a desired shape, and the molded product is likely to have unevenness or a flash. Therefore, such a method is hardly applicable to a field of e.g. a contact lens where a precise working is required. Further, a number of molds of various specifications are required for mass production, such being uneconomical.

In a case where a molded product is prepared by a method wherein a starting material rubber is extrusion-molded or subjected to calendering, followed by vulcanization to obtain a molded product, the product is also likely to have unevenness or a flash, and a number of molds of various specifications are required for mass production, such also being uneconomical.

Under the circumstances, the present inventors have conducted extensive research to overcome the above-mentioned problems in the conventional methods and to provide a method whereby a molded product having a desired shape can readily be produced from a soft lens material. As a result, they have found a method for machining such a soft lens material, whereby the problems can be solved. The present invention has been accomplished on the basis of this discovery.

The present invention provides a method for preparing a soft ocular lens, which comprises machining a machinably hard polymer blend body composed essentially of a soft lens material and a hard polymer into an ocular lens shape, and removing the hard polymer from the shaped product.

The present invention also provides a soft ocular lens made of a polymer alloy consisting essentially of a soft lens material and a hard polymer fixed in the soft lens material in an amount effective for the reinforcement of the soft lens material without impairing the oxygen permeability of the soft lens material.

Now, the present invention will be described in detail with reference to the preferred embodiments.

Figure 1:
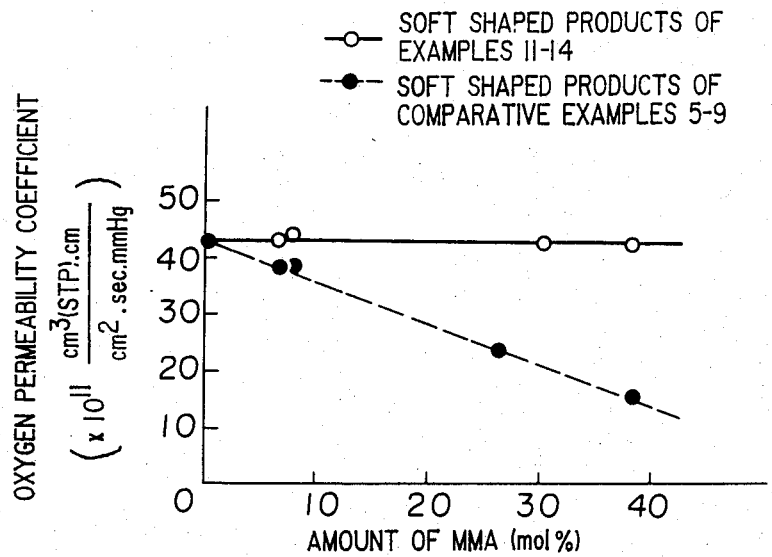
FIG. 1 is a graph obtained by plotting the oxygen permeability coefficients of the soft shaped products obtained in the Examples and Comparative Examples against the amounts of MMA (methyl methacrylate) fixed in the shaped products.

Usually, a water-nonabsorptive soft ocular lens material is hardly worked by machining at room temperature. Whereas, according to the method of the present invention, a hard polymer is employed to harden the conventional soft material, whereby the hardened soft material can readily be machined into a desired shape at room temperature without cooling, and then after the machining, the hard polymer contained in the shaped product is removed, whereby a shaped product composed essentially of a soft ocular lens material having properties substantially equal to the original soft ocular lens material can be obtained.

The soft lens material to be used in the present invention is a soft polymer having a cross-linked structure by chemical bonds such as covalent bonds or ionic bonds which are hardly decomposed by a solvent, a monomer and other reagents used in the present invention. The soft lens material used in the present invention is a soft polymer to which machining such as cutting or grinding is hardly applicable under a usual environmental atmosphere without being swelled with water or other solvents. If the glass transition temperature of such a soft polymer exceeds 40° C., the soft lens material is sufficiently hard under a usual environmental atmosphere without being swelled with water or other solvents, so that it can be worked by a machining method such as cutting or grinding. Therefore, a soft polymer having a glass transition temperature of not higher than 40° C., preferably not higher than 30° C., is suitably used as the soft lens material in the present invention.

Specific examples of the monomer which gives such a soft polymer, include (meth)acrylates such as alkyl or alkoxyalkyl (meth)acrylates including methyl acrylate, ethyl acrylate, isopropyl acrylate, n-propyl (meth)acrylate, isobutyl acrylate, n-butyl (meth)acrylate, 2-ethylhexyl (meth)acrylate, n-octyl (meth)acrylate, n-decyl (meth)acrylate, n-dodecyl (meth)acrylate, n-tetradecyl (meth)acrylate, cyclohexyl acrylate, 2-ethoxyethyl acrylate, 3-ethoxypropyl acrylate, 2-methoxyethyl acrylate and 3-methoxypropyl acrylate, organosiloxysilylalkyl (meth)acrylates, and fluoroalkyl (meth)acrylates; styrenes such as alkylstyrenes including 4-dodecylstyrene, 4-hexylstyrene, 4-nonylstyrene and 4-octylstyrene, organosiloxysilyl(alkyl)styrenes, and fluoroalkylstyrenes; vinylesters such as vinyl acetate and cyclopentyl acetate; dienes such as chloroprene, isoprene and butadiene; and vinyl ethers such as ethyl vinyl ether and butyl vinyl ether. These monomers may be used alone or in combination as a mixture of two or more.

Such a monomer for a soft polymer may be copolymerized with other monomers.

Such other monomers may be, for example, in order to impart a hydrophilic nature, a hydroxyalkyl (meth)acrylate such as 2-hydroxyethyl (meth)acrylate, hydroxybutyl (meth)acrylate or hydroxypropyl (meth)acrylate, an (alkyl)aminoalkyl (meth)acrylate such as 2-dimethylaminoethyl (meth)acrylate or 2-butylaminoethyl (meth)acrylate, an alkyl (meth)acrylamide such as N,N-dimethylacrylamide, glycerol mono(meth)acrylate, propyleneglycol mono(meth)acrylate, polyglycol mono(meth)acrylate, vinylpyrrolidone, (meth)acrylic acid, maleic anhydride, maleic acid, aminostyrene, or hydroxystyrene, or in order to impart oxygen permeability, an organosiloxysilylalkyl (meth)acrylate such as tris(trimethylsiloxy)silyl propyl (meth)acrylate or a fluoroalkyl (meth)acrylate such as hexafluoroisopropyl (meth)acrylate or trifluoroethyl (meth)acrylate.

In order to impart other functions, glycidyl (meth)acrylate, vinyl chloroacetate or 2-chloroethyl vinyl ether may be used as a comonomer.

Said other monomers may be used in an amount of from 0.1 to 100 mol parts, preferably from 10 to 50 mol parts, relative to 100 mol parts of the monomer for the soft polymer.

For the control of the elasticity of the soft polymer, methyl methacrylate, t-butyl methacrylate, styrene, t-butylstyrene, α-methylstyrene, (meth)acrylonitrile or a vinyl toluene may be added in an amount of from 0.1 to 100 mol parts, preferably from 10 to 100 mol parts, relative to 100 mol parts of the monomer for the soft polymer.

Such other monomers may be combined to the monomer for the soft polymer, alone or in combination as a mixture of two or more.

Further, a cross-linking agent may be added, as the case requires, to the monomer for the soft polymer or to a mixture of such a monomer with other monomers, for cross-linking. Such a cross-linking agent includes ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, 1,3-butylene glycol dimethacrylate, allyl diglycol carbonate, triallyl cyanurate, diallyl phthalate, N,N'-methylenebisacrylamide, N,N'-methylenebismethacrylamide and divinylbenzene.

Such a cross-linking agent is incorporated usually in an amount of from 0.1 to 10 mol parts, preferably from 0.5 to 4 mol parts, relative to 100 mol parts of the monomer for the soft polymer or to the mixture of such a monomer with other monomers.

As the soft lens material, it is possible to use, other than the above-mentioned soft lens material made of the monomer for the soft polymer or made of such a monomer and other monomers, a polymer obtained by cross-linking or curing a material such as polyethylene, polyisobutylene, natural rubber, an emulsion polymerized styrene-butadiene rubber, a solution-polymerized styrene-butadiene rubber or a fluoro rubber with a suitable cross-linking agent or by a suitable cross-linking or curing method.

As such a suitable cross-linking method, a cross-linking method using, for example, sulfur, an organic peroxide or a radiation may be mentioned.

For example, a copolymer composed of n-butyl acrylate and 2-chloroethyl vinyl ether, can be cross-linked or cured by sulfur. Such a cross-linked polymer may also be used in the present invention.

In addition to the foregoing, it is also possible to employ a silicone rubber obtained by the addition reaction of both terminal vinyl polydimethylsiloxane and polymethylhydrosiloxane, or a polyurethane.

The hard polymer to be used in the present invention may be a linear polymer containing no cross-linked structure or capable of forming no cross-linked structure. Its glass transition temperature is at least 60° C., preferably at least 90° C., and it provides a sufficient hardness to the polymer blend body so that the polymer blend body can be machined at room temperature under a usual environmental atmosphere. Specific examples of such a hard polymer include vinyl polymers such as polymethyl methacrylate, poly-t-butyl methacrylate, polystyrene, poly-α-methylstyrene, poly-t-butylstyrene, polyvinyl chloride, poly-4-methylpentene-1, polymethacrylic acid and its salt, poly-N,N-dimethylacrylamide, poly(meth)acrylonitrile, poly-2-chlorostyrene and 3-chlorostyrene; and condensation polymers such as polyester, polyamide, polycarbonate, polyphenyleneoxide, polyacetal and polycellulose acetate.

These polymers may be used alone or in combination as a mixture of two or more.

The soft lens material and the hard polymer are blended to such an extent that the resulting polymer blend body can be worked by machining at room temperature under a usual environmental atmosphere. Thus, the soft lens material and the hard polymer are dispersed to each other to give a polymer blend body having a desired hardness. It is preferred that the soft lens material and the hard polymer are uniformly dispersed.

Therefore, it is necessary to properly choose the combination of the soft lens material and the hard polymer so that they are uniformly dispersed. If the dispersibility is poor, it is necessary to use a compatibilizing agent as will be mentioned hereinafter.

The proportions of the soft lens material and the hard polymer in the polymer blend body vary depending upon the desired hardness of the polymer blend body. However, it is usually preferred that the soft lens material is from 20 to 60% by weight, and the hard polymer is from 40 to 80% by weight.

The polymer blend body can be obtained by impregnating into the soft lens material a monomer for the hard polymer, followed by polymerization of the monomer.

Now, the preparation of the polymer blend body will be described.

The polymer blend body is prepared by impregnating into a soft lens material a monomer for the hard polymer, followed by polymerization of the monomer. The impregnation is conducted by immersing the soft lens material in the monomer for the hard polymer and permitting it to swell to an equilibrium state. Therefore, the soft lens material is required to be insolubilized by a three dimensional structure formed by e.g. a cross-linking agent. This cross-linked structure is formed by chemical bonds such as covalent bonds or ionic bonds, and it is necessary that such bonds are not destroyed by the series of process steps.

As the monomer for the hard polymer, the one capable of forming a linear polymer containing substantially no cross-linked structure is selected among those capable of letting the soft lens material swell. Such a monomer for the hard polymer includes methyl methacrylate, t-butyl methacrylate, styrene, t-butyl styrene and (meth)acrylonitrile.

When an acrylate soft material composed of e.g. a polyalkyl acrylate is used as the soft lens material, methyl methacrylate or t-butyl methacrylate is preferably used as the monomer for the hard polymer.

The polymerization of the monomer after the impregnation into the soft lens material may be conducted by e.g. radical polymerization, ionic polymerization, photo-polymerization, ultraviolet polymerization, radiation polymerization or polyaddition reaction. The radical polymerization is particularly preferred since the polymerization can be conducted at room temperature under atmospheric pressure, and the polymerizable species are not substantially affected by impurities in the polymerization system, whereby no substantial labor for purification is required and the reproducibility is good.

The polymerization initiator used for the polymerization of the monomer for the hard polymer includes azo-type initiators such as azobisisobutyronitrile, 2,2'-azobis(2,4-dimethylvaleronitrile) and 2,2'-azobis(4-methoxy-2,4-dimethylvaleronitrile), organic peroxides such as benzoyl peroxide and di-t-butyl peroxide, potassium persulfate and ammonium persulfate. Such a polymerization initiator is used usually in an amount of from 0.01 to 0.5 mol part relative to 100 mol parts of the monomer.

At the time of polymerization, a proper amount of an inert solvent may be mixed for the purpose of controlling the swelling degree of the soft lens material. As such an inert solvent, benzene or dimethylsulfoxide may be mentioned. Such an inert solvent is used preferably in an amount of not exceeding 30 parts by weight relative to 100 parts by weight of the monomer for the hard polymer. However, when the monomer is polymerized by radical polymerization, it may happen that if a side reaction occurs whereby the polymerization initiator radicals or the growing chain end radicals react with the soft lens material by chain transfer reaction, chemical bonds will be formed between the hard polymer and the soft lens material, and the hard polymer will not completely be removed by the subsequent extraction of the hard polymer by means of a solvent, and the hard polymer remains too much to obtain an ocular lens having the desired shape or elasticity.

Such a side reaction may be prevented by properly selecting the initiator for the polymerization, the monomer and the soft lens material to avoid such a side reaction. However, it is preferred to conduct the polymerization reaction at a relatively low temperature to avoid such a side reaction, or to add a chain transfer agent or a compound susceptible to chain transfer to the monomer in order to prevent the chain transfer reaction to the soft lens material. As such a chain transfer agent or a compound susceptible to chain transfer, mercaptans such as n-butylmercaptan, dodecylmercaptan and thioglycollic acid, disulfides such as tetraalkylthiuram disulfide and xanthic acid disulfide, diazothioether, 2-propanol, chloroform, bromoform, carbon tetrachloride, carbon tetrabromide, acetaldehyde and butylaldehyde may be used. In the present invention, the chain transfer agent is used preferably in an amount of not exceeding 10 mol parts relative to 100 mol parts of the monomer for the hard polymer. If the amount of the chain transfer agent is excessive, the molecular weight of the hard polymer formed in the soft lens material will be low, and the resulting polymer blend tends to be brittle.

It is preferred to choose the soft lens material and the hard polymer taking the compatibility into account. When those being not so compatible to each other are used in combination, a compatibilizing agent may preferably be incorporated either by dissolving it or emulsifying it in the monomer for the hard polymer, for the purpose of improving the compatibility.

As a compatibilizing agent to be used in the present invention, a block or graft copolymer may be mentioned which has a polymer component being the same as or highly compatible with the soft lens material and a polymer component being the same as or highly compatible with the hard polymer. Such a compatibilizing agent is used usually in an amount of from 1 to 10 parts by weight relative to 100 parts by weight of the polymer blend body. For example, when a silicone soft material is hardened by styrene, it is difficult to obtain a proper polymer blend body because of their poor compatibility. In such a case, it is desirable to incorporate a block copolymer of poly(styrene-b-dimethylsiloxane) or a graft copolymer of poly(styrene-g-dimethylsiloxane) as a compatibilizing agent.

The above-mentioned polymerization initiator, chain transfer agent or compatibilizing agent is used as uniformly dissolved or emulsified in a monomer for the hard polymer.

After the hardening by polymerization as mentioned above, the obtained polymer blend body which is sufficiently hard is subjected to machining such as cutting or grinding under a usual environmental atmosphere and, if necessary, to polishing, to obtain a shaped product of the polymer blend material.

The polymer blend shaped product contains the hard polymer in the soft lens material and blended in such a state that the soft lens material is swollen. The shaped product shrinks to some extent when the hard polymer is removed, as will be described in detail hereinafter. Therefore, it is desired to predetermine the degree of the swelling of the shaped product and to apply machining to obtain a shaped product having the desired size and configuration accordingly.

Then, the shaped product obtained by machining is immersed in a suitable solvent to remove the hard polymer contained in the soft lens material.

The suitable solvent is a solvent which is capable of dissolving the hard polymer and letting the soft lens material swell. Specific examples of such a solvent include chloroform, methylene chloride, ethylene chloride, carbon tetrachloride, benzene, toluene, xylene, tetrahydrofuran, dioxane, methyl ethyl ketone, ethyl acetate and methyl acetate. In the present invention, not only the above-mentioned solvents but also other solvents may be employed.

After removing the hard polymer adequately from the shaped product, the shaped product is dried to obtain an ocular lens having a desired shape.

The hard polymer may be removed completely from the shaped product so that the resulting ocular lens is made of the soft lens material. When the soft lens material is to be used for a soft contact lens, it is desirable to select one having good oxygen permeability among various soft lens materials. However, among those having good oxygen permeability, there are some which have poor mechanical strength. In such a case, it is advantageous that the hard polymer remains as fixed to the soft lens material for the reinforcement of the soft lens material without impairing the oxygen permeability of the soft lens material.

Namely, in a preferred embodiment, the polymer blend body is prepared by impregnating into the soft lens material a solution of a monomer for the hard polymer having a chain transfer agent added thereto, followed by polymerization of the monomer. There will be two types of the hard polymer formed in the soft lens material i.e. one fixed in the polymer blend body and the other not fixed. The proportions of the hard polymers fixed and not fixed can be controlled by the amount of the chain transfer agent added for polymerization. Then, the hard polymer not fixed in the polymer blend body is removed from the shaped product to obtain a soft ocular lens of a polymer alloy consisting essentially of the soft lens material and the hard polymer fixed in the soft lens material. The soft ocular lens made of such a polymer alloy contains the hard polymer fixed in the soft lens material in an amount effective for the reinforcement of the soft lens material without impairing the oxygen permeability of the soft lens material.

In the above preferred embodiment, a part of the hard polymer can be fixed in the soft lens material when the polymer blend body is prepared by the polymerization of the monomer for the hard polymer. When an ocular lens is prepared from such a polymer blend body in the same manner as mentioned above, the polymer blend body will be a mixture of the soft lens material, the hard polymer fixed in the soft lens material and the hard polymer not fixed in the soft lens material. A polymer alloy comprising the soft lens material and the hard polymer fixed therein is obtained by removing the hard polymer not fixed in the soft lens material from the polymer blend body. It is surprising that the ocular lens made of the polymer alloy thus obtained has no deterioration in the transparency and has high strength without impairing the oxygen permeability of the soft lens material.

Specific example of the monomer for the soft polymer useful in this preferred embodiment includes (meth)acrylates such as methyl acrylate, ethyl acrylate, isopropyl acrylate, n-propyl (meth)acrylate, isobutyl acrylate, n-butyl (meth)acrylate, 2-ethylhexyl acrylate, n-octyl (meth)acrylate, n-decyl methacrylate, n-dodecyl (meth)acrylate, n-tetradecyl (meth)acrylate, 2-ethoxyethyl acrylate, 3-ethoxypropyl acrylate, 2-methoxyethyl acrylate and 3-methoxypropyl acrylate. Particularly preferred is an alkyl acrylate having at least 4 carbon atoms, since such an alkyl acrylate provides excellent oxygen permeability. These monomers may be used alone or in combination as a mixture.

As the hard polymer, it is particularly preferred to use vinyl polymers among those hard polymers mentioned above for the reason that radical polymerization can be employed.

Such a hard polymer plays not only a role of facilitating the machining of the soft lens material but also a role of increasing the strength necessary for the lens material without impairing the oxygen permeability of the soft lens material by fixing a part of the hard polymer in the soft lens material to form a polymer alloy composed essentially of the soft lens material and the fixed hard polymer, which remains after the removal of the non-fixed hard polymer from the shaped product of the polymer blend body by means of a solvent.

In this preferred embodiment, the polymer blend body is a mixture comprising the soft lens material, a part of the hard polymer fixed in the soft lens material and the rest of the hard polymer not fixed in the soft lens material. The soft lens material and the fixed hard polymer constituting a polymer alloy are sufficiently dispersed to each other to increase the strength of the polymer alloy after the removal of the non-fixed hard polymer without impairing the oxygen permeability of the soft lens material.

As the monomer for the hard polymer useful in this preferred embodiment, a monomer capable of reacting with the soft lens material mainly by a chain transfer reaction under the polymerization condition of the present invention is used so that a part of the resulting hard polymer fixed to the soft lens material is selected among those having an ability of letting the soft lens material swell. As such a monomer, it is preferred to employ a monomer giving a vinyl polymer, such as methyl methacrylate, t-butyl methacrylate, styrene, t-butylstyrene, (meth)acrylonitrile, methacrylic acid, acrylamide or N-vinylpyrrolidone.

Now, the fixing of the hard polymer in the soft lens material will be described. In the present invention, the fixing means a state where the hard polymer stays in the soft lens material without elution when the polymer blend body composed of the soft material and the hard polymer is dipped in a solvent.

The fixing of the hard polymer may be conducted by properly adjusting the polymerization initiator used for the polymerization, the polymerization temperature or the polymerization time. However, when radical polymerization is employed, the amount of the fixed hard polymer can optionally and effectively be adjusted by controlling the amount of the addition of the chain transfer agent during the polymerization.

Among various chain transfer agents mentioned before, sulfur-containing compounds having high chain transfer properties are particularly effective in this preferred embodiment.

The chain transfer agent is used in an amount effective to fix the hard polymer in the soft lens material in an amount effective for the reinforcement of the soft lens material without impairing the oxygen permeability thereof. In general, the amount of the fixed hard polymer is inversely proportional to the amount of the chain transfer agent used. Namely, if the amount of the chain transfer agent is too small, the majority of the hard polymer will be fixed in the soft lens material, and the substantial amount of the hard polymer will remain after the treatment with a solvent, whereby the resulting product will no longer be soft and will be a hard or leather-like product having low dimensional stability. On the other hand, if the amount is excessive, no substantial hard polymer will be fixed, whereby no adequate reinforcement of the soft lens material will be obtained.

The amount of the chain transfer agent varies depending upon the type of the soft lens material, the type of the monomer for the hard polymer and the amount of the polymerization initiator and can not generally be defined. As an example, when 20 g of methyl methacrylate is used as the monomer for the hard polymer and a cross-linked poly(n-butyl acrylate) as the soft lens material (diameter: 13.5 mm, height: 15 mm) is dipped in this monomer and permitted to reach the equilibrium condition in swelling, followed by an addition of 0.16 mol%, based on the monomer, of azobisdimethylvaleronitrile as the polymerization initiator and by polymerization at 30° C., if the amount of dodecylmercaptan as the chain transfer agent is less than 0.010 mol % based on the monomer, the amount of the fixed polymethyl methacrylate will be substantial and the shaped product will have a poor dimensional stability when the thickness is thin. If the amount of dodecylmercaptan is more than 0.2 mol % based on the monomer, no substantial amount of polymethyl methacrylate will be fixed, whereby no adequate improvement in the strength will be obtained. The amount of fixed polymethyl methacrylate here is within a range of from about 5 to about 50 by the monomer unit (mol %).

The hard polymer blend body composed essentially of the soft lens material, the fixed hard polymer and the non-fixed hard polymer, is then machined into an ocular lens shape, followed by removing the non-fixed hard polymer from the shaped product to obtain a soft ocular lens of a polymer alloy consisting essentially of the soft lens material and the hard polymer fixed in the soft lens material.

It is important that the non-fixed hard polymer is thoroughly removed. Otherwise, there will be a problem such that the dimensional stability of the ocular lens tends to be poor, or the eye tissue will be affected by the eluate from the lens.

Thus, according to this preferred embodiment, it is possible to obtain a soft ocular lens material of a polymer alloy wherein a part of the hard polymer is fixed in a soft lens material, which has a substantially improved strength without losing the oxygen permeability.

In the present invention, it is important that the polymer blend body is uniform. In order to obtain a uniform polymer blend body by impregnation into the soft lens material a monomer for the hard polymer, followed by polymerization of the monomer, it is necessary to uniformly impregnate the monomer and other reagents, e.g. initiator, chain transfer agent into the soft lens material. The impregnation of the monomer for the hard polymer and other reagents into the soft lens material is conducted usually by immersing the soft lens material in an excess amount of the monomer solution and permitting it to swell. When immersed, the soft lens material tends to expand and swell three-dimensionally isotropically, whereupon the penetration of the monomer molecules for the hard polymer and other reagents molecules into the soft lens material starts three-dimensionally isotropically. Such swelling and penetration start from the outermost circumferential portion of the soft lens material, and the penetration progresses from the circumferential portion towards inside as the swelling progresses. Under an ideal condition, the polymerization of the monomer for the hard polymer should start after the swelling has reached the equilibrium state. Here, the equilibrium state means that there is no dynamical change when observed macroscopically. If this ideal condition is not satisfied, e.g. if the polymerization of the monomer starts during the process of swelling, the penetration of the monomer and other reagents into the soft lens material tends to be limited at the peripheral portion, whereby the formation and the blending with the hard polymer will be predominantly at the peripheral portion. The hard polymer formed at the peripheral portion slows down the further swelling of the soft material, which in turn slows down the penetration of the monomer and other reagents into the interior of the soft lens material, while the polymerization of the excess monomer progresses. As a result, when the polymerization reaches 100%, there will be a substantial difference in the proportion of the formed hard polymer, hence in the distribution of the hard polymer, as between the peripheral portion and the center portion of the soft lens material. The hardness of the polymer blend body varies corresponding to the difference in the distribution of the hard polymer, and if the difference is substantial, it will be difficult to conduct the subsequent machining uniformly. Such a problem depends on the volume and the type of the soft lens material. Namely, the problem becomes distinctive when the soft lens material used has a large volume or is of a type being slow in swelling. When a soft lens material having a small volume and a high swelling rate is used, there will be no substantial problem, but it is still unavoidable that non-uniformity results to some extent. Thus, the problem remains particularly when a product of uniform quality is desired. It is conceivable to conduct polymerization with an addition of a polymerization initiator and, if necessary, a chain transfer agent to the system after the soft lens material immersed in a monomer for the hard polymer has reached the equilibrium state in swelling. In such a case, however, the penetration rate of the initiator will be controlling, and the polymerization will start from the periphery. When a soft lens material having a large volume is employed, it is still likely that the center portion remains to be not polymerized or blended.

It has been found possible to obtain a uniform polymer blend body by adding a polymerization inhibitor to the impregnation system. Thus in another preferred embodiment, the polymer blend body is prepared by impregnating into the soft lens material a monomer solution comprising a monomer for the hard polymer, a radical polymerization initiator, a chain transfer agent and a polymerization inhibitor. The monomer solution preferably comprises 100 mol parts of the monomer, from 0.01 to 0.5 mol part of the polymerization initiator, not more than 10 mol parts of the chain transfer agent and from 0.015 to 0.05 equivalent, relative to the polymerization initiator, of the polymerization inhibitor.

The polymerization inhibitor is known to have an ability of deactivating the active radical species formed by the decomposition of the radical initiator and preventing them from serving for the polymerization of the monomer for the hard polymer (this ability will be referred to as inhibiting ability). Formation of the active radical species from the radical initiator is statistic, and the consecutively formed active radical species will be deactivated by the polymerization inhibitor as they form, during which no substantial polymerization of the monomer will be initiated. When the polymerization inhibitor present in a predetermined amount in the system has been consumed, the active radical species formed thereafter will serve for the first time to initiate the polymerization of the monomer. Thus, in such a polymerization system, there will be an induction period during which no substantial polymerization of the monomer takes place, and during which the swelling of the soft lens material to the equilibrium state can be completed. The present inventors have found that the polymer blend body obtained by this method is extremely uniform, and the shaped soft lens product obtained from this polymer blend body by a series of operations is of high quality with a constant prescribed shape.

A uniform polymer blend body may also be prepared by letting the soft lens material swell to the equilibrium state in a monomer for the hard polymer, followed by initiating the polymerization of the monomer by irradiation with light, ultraviolet rays or radiation. However, an apparatus for such irradiation is usually very expensive, and substantial electric power will be required for the irradiation, such being uneconomical. Whereas, by the above-mentioned radical polymerization by using a polymerization inhibitor, a uniform polymer blend body can readily be obtained without requiring such an expensive apparatus.

Among the hard polymers useful for the present invention, vinyl polymers such as polymethyl methacrylate, poly-t-butyl methacrylate, polystyrene, poly-t-butylstyrene, polymethacrylic acid and its salt, polyacrylamide, poly(meth)acrylonitrile, poly-2-chlorostyrene and 3-chlorostyrene are particularly preferred in this embodiment wherein radical polymerization is conducted by using a polymerization inhibitor.

In this embodiment, in addition to the polymerization initiator and the chain transfer agent, a polymerization inhibitor is employed. The polymerization inhibitor in this embodiment has a role of deactivating the active radical species formed by the decomposition of the radical initiator and preventing them from serving to initiate the polymerization of the monomer for the hard polymer. Therefore, it is preferred to employ a polymerization inhibitor having a high ability to deactivate the active radical species. Such a polymerization inhibitor includes 1,1-diphenyl-2-picrylhydrazyl (hereinafter referred to as DPPH), 1,3,5-triphenylverdazyl (hereinafter referred to as VDZ), 2,6-di-t-butyl-α-(3,5-di-t-butyl-4-oxo-2,5-cyclohexadiene-1-ylidene-p-tolyloxy, 2,2,6,6-tetramethyl-4-piperidone-1-oxyl. Among them, DPPH and VDZ are preferably employed since they are readily available. The amount of the polymerization inhibitor varies depending upon the types and amounts of the soft lens material, the monomer, the radical initiator and the chain transfer agent and can not generally be defined. However, if the concentration of the polymerization inhibitor is higher than the concentration of the initiator, all of the active radical species formed by the decomposition of the radical initiator will be deactivated by the polymerization inhibitor, whereby it will be impossible to initiate the polymerization of the monomer, whereby the hard polymer will not be formed, such being undesirable. For example, when the soft lens material has a diameter of from 14 to 15 mm and a length of 10 cm, the equilibrium state in swelling will be reached in the monomer within a period of from 2 days to 4 days, and it is preferred to control the amount of the polymerization inhibitor to provide such an induction period. In general, the polymerization inhibitor is used within a range of from 0.015 to 0.05 equivalent, relative to the concentration of the initiator. If the amount is less than 0.015 equivalent, the induction period before the initiation of the polymerization will not be substantial, and the polymerization will be initiated during the course of swelling, such being undesirable. On the other hand, if the amount exceeds 0.05 equivalent, the induction period will be long, and it takes a long period of time for the preparation of the polymer blend body, such being uneconomical. In this embodiment, it is preferred to predetermine the time until the soft lens material reaches completely the equilibrium state in swelling, and the amount of the polymerization inhibitor is preliminarily determined so that the corresponding induction period will be given. Further, among the polymerization inhibitors, there are some wherein the inhibiting ability is destroyed by the chain transfer agent before deactivating the radical initiator. Therefore, the chain transfer agent is properly selected depending upon the type of the polymerization inhibitor. For example, DPPH will be destroyed by a chain transfer agent such as mercaptan, and other chain transfer agent such as carbon tetrabromide is preferably employed in combination with DPPH.

It is preferred that the radical initiator, the chain transfer agent and the polymerization inhibitor are dissolved or emulsified uniformly in the monomer prior to immersing the soft lens material into the monomer for the hard polymer.

The soft material thus obtained is composed essentially of a soft lens material showing no or little water absorptivity.

In general, a water-nonabsorptive or slightly absorptive soft ocular lens material has a high water repellency and high lipophilic nature, and if a contact lens made of such material is put on the eye, lipid in the tear is likely to deposit on the lens surface. If the lipid accumulate on the lens surface, the lens tends to have white turbidity or it tends to give an uncomfortable feeling or a pain to the wearer or damage the corneal tissues. In order to reduce such problems, it is common to apply corona discharge treatment or chemical treatment with an acid or base to give a hydrophilic nature to the lens surface. Such a hydrophilic surface treatment is effective to prevent the deposition of the lipid, but such a treated hydrophilic layer is usually thin, and can easily be peeled off by e.g. repeated washing of the lens so that the surface of the base material prior to the treatment for preparing hydrophilic surface will be exposed. The exposed surface has water repellency and susceptible to deposition of the lipid.

Therefore, it is desirable that the material itself has resistance against the deposition of the lipid and affinity to tear.

The present inventors have now found that a soft lens material prepared by polymerizing a monomer material composed essentially of one or more monomers selected from the group consisting of compounds of the formula:

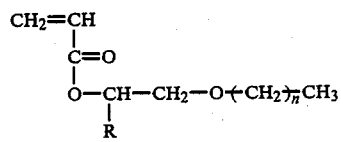

(a)

wherein R is —H or —CH$_3$, n is 0 or 1, provided that when n is 1, R is —H, and compounds of the formula:

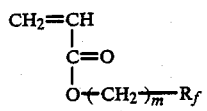

(b)

wherein $R_f$ is —C$_a$H$_b$F$_{2a+1-b}$ wherein a is an integer of from 1 to 7 and b is 0 or 1, and m is an integer of from 0 to 2 is substantially water-nonabsorptive and has excellent ability for preventing the deposition of the lipid and affinity to tear.

Namely, in another preferred embodiment of the present invention, the soft lens material is prepared by polymerizing a monomer material composed essentially of one or more monomers selected from the group consisting of compounds of the formula (a) and (b). It is thereby possible to obtain a soft contact lens which is substantially water-nonabsorptive and which has excellent ability to prevent the deposition of the lipid and excellent affinity to tear. The monomers represented by the formula (a) include alkoxyalkyl acrylates such as 2-methoxyethyl acrylate, 2-ethoxyethyl acrylate and 1-methyl-2-methoxyethyl acrylate. The monomers represented by the formula (b) include fluoroalkyl acrylates such as 1H,1H-trifluoroethyl acrylate, 1H,1H-pentafluoropropyl acrylate, 1H,1H-heptafluorobutyl acrylate, 1H,1H,3H-hexafluorobutyl acrylate, 1H,1H-nonafluoropentyl acrylate, 1H,1H,5H-octafluoropentyl acrylate, 1H,1H-undecafluorohexyl acrylate, 1H,1H-tridecafluoroheptyl acrylate and 1,1,1,3,3,3-hexafluoro-2-propyl acrylate. Among the above monomers, 2-methoxyethyl acrylate as a monomer of the formula (a) and a fluoroalkyl acrylate having an ester moiety of from 3 to 5 carbon atoms as a monomer of the formula (b) are particularly preferred, as they present a water-nonabsorptive soft contact lens having excellent elasticity. A soft lens material obtained by polymerizing a monomer material composed essentially of one or more monomers selected from the compounds of the formulas (a) and (b) is substantially water-nonabsorptive. In order to provide a hydrophilic nature, a certain amount of a hydrophilic monomer may be copolymerized to the above monomer.

As such a hydrophilic monomer, e.g. 2-hydroxyethyl (meth)acrylate, N-vinylpyrrolidone or N,N-dimethyl acrylamide may be employed. Particularly when one or more monomers selected from the group consisting of the compounds of the formula (b) are used as the soft lens material, such a material exhibits very low water absorptive properties, and the above-mentioned hydrophilic monomer may be used within a range of from about 0 to 20 mol parts relative to 100 mol parts of the entire monomer mixture.

Further, for the purpose of controlling the elasticity of the soft lens material, a monomer capable of providing a high glass transition temperature may be copolymerized to the monomer material selected from the group consisting of the compounds of the formulas (a) and (b). The glass transition temperature of polymer of such a monomer is usually at least 60° C., preferably at least 80° C., so that the control of the hardness can readily be accomplished. As the monomer capable of providing such a high glass transition temperature, methyl methacrylate, (meth)acrylonitrile, styrene or trifluoroethyl methacrylate may be mentioned. Such a monomer may be used preferably within a range of from about 0 to 25 mol parts relative to 100 mol parts of the monomer material selected from the group consisting of the compounds of the formulas (a) and (b), since if the amount is too much, the elasticity of the soft lens material will be impaired. Now, the present invention will be described in detail with reference to Examples. However, it should be understood that the present invention is by no means restricted to such specific Examples. In the Examples, "parts" means "parts by weight".

EXAMPLE 1

A mixture comprising 98.8 mol parts of n-butyl acrylate, 1.2 mol of ethylene glycol dimethacrylate and 0.05 mol part of 2,2'-azobis(2,4-dimethylvaleronitrile) was deaerated, then flushed with nitrogen and introduced into a cylindrical glass container having an inner diameter of 12 mm. Nitrogen gas was introduced into this glass container, and an opening of the glass container was closed with a stopper. Polymerization was conducted at 30° C. for 48 hours. Then, the temperature was gradually raised and polymerization was conducted at 50° C. for 5 hours, at 80° C. for 3 hours and at 100° C. for 2 hours to obtain a soft lens material. The soft lens material was elastic at room temperature and transparent.

Then, 10 parts of a soft lens material cut out from the cylindrical shaped soft lens material thus obtained, was placed in a cylindrical glass container having an inner diameter of about 16 mm and containing a solution prepared by uniformly mixing 97.6 parts of methyl methacrylate, 2 parts of dodecylmercaptan and 0.4 part of 2,2'-azobis(2,4-dimethylvaleronitrile) and immersed in the solution. Then, nitrogen gas was filled in the container, and the container was closed with a stopper. The soft lens material was permitted to swell to an equilibrium state at a temperature slightly lower than 30° C., and then polymerized at 30° C. for 3 days to obtain a polymer blend body. The polymer blend body thus obtained was slightly turbid with white.

Then, the polymer blend body was machined and polished into a contact lens shape at room temperature under a usual environmental atmosphere, whereby the machining and polishing could readily be accomplished because the polymer blend body was sufficiently hard.

The shaped product thus obtained was immersed and permitted to swell in chloroform for 5 hours to remove polymethyl methacrylate as the hard polymer component and then dried to obtain a transparent shaped product having a shape of a contact lens with its surface sufficiently polished and having the same elasticity as the soft lens material used as the starting material.

COMPARATIVE EXAMPLE 1

A soft lens material was prepared in the same manner as in Example 1. It was attempted to machine the soft lens material, but the material was too soft to be worked by machining.

EXAMPLE 2

A mixture comprising 80.7 mol parts of n-butyl acrylate, 18.1 mol parts of n-butyl methacrylate, 1.2 mol parts of ethylene glycol dimethacrylate and 0.05 mol part of 2,2'-azobis(2,4-dimethylvaleronitrile) was deaerated, then flushed with nitrogen and introduced into a cylindrical glass container having an inner diameter of 12 mm. Nitrogen gas was introduced into the glass container, and an opening of the glass container was closed with a stopper. Polymerization was conducted at 30° C. for 48 hours. Then, the temperature was gradually raised, and polymerization was conducted at 50° C. for 5 hours, at 80° C. for 3 hours and at 100° C. for 2 hours to obtain a soft lens material. The soft lens material was elastic at room temperature and transparent.

Then, the soft lens material was immersed in the same solution as used in Example 1 and treated in the same manner as in Example 1 to obtain a polymer blend body. The polymer blend body thus obtained was slightly turbid with white.

Then, the polymer blend body was machined and polished into a contact lens shape at room temperature under a usual environmental atmosphere, whereby the machining and polishing could readily be accomplished since the polymer blend body was sufficiently hard.

The shaped product thus obtained was immersed and permitted to swell in chloroform for 5 hours to remove polymethyl methacrylate as the hard polymer component and dried to obtain a transparent shaped product having a contact lens shape with its surface sufficiently polished and having the same elasticity as the soft lens material used as the starting material.

COMPARATIVE EXAMPLE 2

A soft lens material was prepared in the same manner as in Example 2. It was attempted to machine the soft lens material, but the material was too soft to be worked by machining.

EXAMPLE 3

A mixture comprising 99.0 mol parts of ethyl acrylate, 1.0 mol part of ethylene glycol dimethacrylate and 0.04 mol part of 2,2-azobis(2,4-dimethylvaleronitrile) was deaerated, then flushed with nitrogen and introduced into a cylindrical glass container having an inner diameter of 12 mm. Nitrogen gas was introduced into this glass container, and an opening of the glass container was closed with a stopper. Polymerization was conducted at 30° C. for 48 hours. Then, the temperature was gradually raised, and polymerization was conducted at 50° C. for 5 hours, at 80° C. for 3 hours and at 100° C. for 2 hours to obtain a soft lens material. The soft lens material thus obtained was elastic at room temperature and transparent.

Then, 10 parts of the soft lens material thus obtained was introduced into a cylindrical glass container having an inner diameter of about 16 mm and containing a solution prepared by mixing 97.6 parts of methyl methacrylate, 2.1 parts of dodecylmercaptan and 0.3 part of 2,2'-azobis(2,4-dimethylvaleronitrile) and immersed in the solution. Nitrogen gas was filled in the container, and the container was closed with a stopper. The soft lens material was permitted to swell to the equilibrium state at a temperature slightly lower than 30° C. and then polymerization was conducted at 30° C. for 3 days to obtain a polymer blend body. The polymer blend body thus obtained was transparent.

Then, the polymer blend body was machined and polished into a contact lens shape at room temperature under a usual environmental atmosphere, whereby the machining and polishing could readily be accomplished since the polymer blend body was sufficiently hard.

The shaped product thus obtained was immersed and permitted to swell in chloroform for 5 hours to remove polymethyl methacrylate as the hard polymer component and then dried to obtain a transparent shaped product having a contact lens shape with its surface sufficiently polished and having the same elasticity as the soft lens material used as the starting material.

COMPARATIVE EXAMPLE 3

A soft lens material was prepared in the same manner as in Example 3. It was attempted to machine the soft lens material, but the material was too soft to be worked by machining.

EXAMPLES 4 to 9

A mixture of raw materials for a soft lens material having the composition as identified in Table 1, was polymerized in the same manner as in Example 1 to obtain a soft lens material. The soft lens material thus obtained was elastic and soft at room temperature and transparent.

Then, 10 parts of the soft lens material thus obtained was introduced into a container containing a solution prepared by uniformly mixing 97.6 parts of methyl methacrylate, 2 parts of dodecylmercaptan and 0.4 part of 2,2'-azobis(2,4-dimethylvaleronitrile) and immersed in the solution. Then, polymerization was conducted in the same manner as in Example 1 to obtain a polymer blend body. Every polymer blend body thus obtained was slightly turbid with white.

The polymer blend body thus obtained was machined and polished into a contact lens shape at room temperature under a usual environmental atmosphere, whereby the machining and polishing could readily be accomplished since the polymer blend body was sufficiently hard.

The shaped product thus obtained was immersed in chloroform and then dried in the same manner as in Example 1 to obtain a transparent shaped product having a contact lens shape with its surface sufficiently polished and having the same elasticity as the soft lens material used as the starting material.

TABLE 1

| | | Composition of raw monomers for soft lens material (mol parts) | | | | | | |
|---|---|---|---|---|---|---|---|---|
| Example No. | n-Butyl acrylate | Ethylene glycol meth-acrylate | Acrylonitrile | Acrylic acid | NVP | TFEMA | SiMA | 2,2-Azobis(2,4-dimethyl-valeronitrile) |
| 4 | 81.0 | 1.2 | 17.8 | 0 | 0 | 0 | 0 | 0.05 |
| 5 | 88.9 | 1.2 | 0 | 9.9 | 0 | 0 | 0 | 0.03 |
| 6 | 79.0 | 1.2 | 0 | 19.8 | 0 | 0 | 0 | 0.03 |
| 7 | 81.0 | 1.2 | 0 | 0 | 17.8 | 0 | 0 | 0.03 |
| 8 | 81.0 | 1.2 | 0 | 0 | 0 | 17.8 | 0 | 0.03 |
| 9 | 81.0 | 1.2 | 0 | 0 | 0 | 0 | 17.8 | 0.05 |

Notes:
NVP: N—vinylpyrrolidone
TFEMA: 2,2,2-trifluoroethyl methacrylate
SiMA: tris(trimethylsiloxy)silylpropyl methacrylate

EXAMPLE 10

A polymer blend body was prepared in the same manner as in Example 1 except that 10 parts of a cylindrical shaped urethane rubber ADAPT-60L (manufactured by Kokusai Chemical K.K.) having a diameter of 12 mm and being transparent and soft and elastic at room temperature, was immersed in a solution of a mixture comprising 97.6 parts of methyl methacrylate, 2 parts of dodecylmercaptan and 0.4 part of 2,2'-azobis(2,4-dimethylvaleronitrile). The polymer blend body thus obtained was transparent.

Then, the polymer blend body was machined and polished into a contact lens shape, whereby the machining and polishing could readily be accomplished since the polymer blend body was sufficiently hard.

Then, the hard polymer contained in the shaped product thus obtained was removed in the same manner as in Example 1, followed by drying to obtain a transparent shaped product having a contact lens shape with its surface sufficiently polished and having the same elasticity as the soft lens material used as the starting material.

COMPARATIVE EXAMPLE 4

It was attempted to machine urethane rubber ADAPT-60L as used in Example 10, but the urethane rubber was too soft to work by machining.

EXAMPLES 11 to 14 and COMPARATIVE EXAMPLE 5

A mixture comprising 98.9 mol parts of n-butyl acrylate, 1.1 mol parts of ethylene glycol dimethacrylate and 0.03 mol part of azobisdimethylvaleronitrile was deaerated, then flushed with nitrogen and introduced into a cylindrical glass container having an inner diameter of 14.5 mm. Nitrogen gas was introduced into this glass container, and an opening of the glass container was closed with a stopper. Polymerization was conducted at 30° C. for 48 hours, at 50° C. for 5 hours, at 80° C. for 3 hours and at 100° C. for 2 hours to obtain a soft lens material. The soft lens material thus obtained was elastic at room temperature and transparent.

Then, a soft lens material cut out to have a length of 15 mm from the cylindrical shaped soft lens material thus obtained, was put into a cylindrical glass container having an inner diameter of about 22 mm containing a solution of a mixture of methyl methacrylate and dodecylmercaptan prepared as identified in Table 2 and immersed in the solution and left to stand at 25° C. for 27 hours to permit the soft lens material to swell to an equilibrium state. Then, a predetermined amount of azobisdimethylvaleronitrile was poured into and mixed with the solution, and nitrogen gas was introduced into the glass container. Then, polymerization was conducted at 30° C. for 3 days to obtain a polymer blend body. The machinability of the polymer blend body was examined on the basis of whether or not it can be machined into a desired shape.

Then, the polymer blend shaped product machined into a thin plate shape was immersed in chloroform for 24 hours to remove non-fixed polymethyl methacrylate as the hard polymer component and dried to obtain a soft shaped product. As the physical properties of the soft shaped product, the transparency, the oxygen permeability coefficient, the needle penetration load, the elongation and the amount of the fixed hard polymer were examined.

Dimensional stability: Evaluated by visual observation.
Transparency: Evaluated by visual observation.
Oxygen permeability coefficient: Measured at 35° C. by Seikaken-type film oxygen permeability tester (manufactured by Rika Seiki Kogyo K.K.).
Needle penetration load: A pressing needle having a diameter of 1/16 inch (about 1.59 mm) was positioned at the center of a soft shaped product of a film form by means of an Instron-type compression tester, and the load (g) at breakage was measured at room temperature.
Elongation: The length elongated up to the breakage was measured by Instron-type compression tester, and the elongation was expressed by percentage (%).
Amount of the fixed hard polymer: The amount of fixed polymethyl methacrylate was obtained by the molar concentration (mol %) of the monomer unit in accordance with the following equation:

$$\text{Fixed MMA (mol \%)} = \frac{(W_2/W_1 - W_2'/W_1')/Mw \text{ of MMA}}{(W_2/W_1 - W_2'/W_1')/Mw \text{ of MMA} + (W_2'/W_1')/Mw \text{ of n-BA}} \times 100$$

where
$W_1$: Weight of the sample before the immersion into the solvent
$W_2$: Weight of the sample after the immersion into the solvent
$W_1'$: Weight of the sample of Comparative Example 5 (as a sample containing a large amount of dodecylmercaptan, i.e. as a sample wherein no substantial fixing of polymethyl methacrylate takes place) before the immersion into the solvent.
$W_2'$: Weight of the sample of Comparative Example 5 after the immersion into the solvent Mw of MMA: Molecular weight of the methyl methacrylate
Mw of n-BA: Molecular weight of n-butyl acrylate amount of the fixed MMA in Examples 11 to 14 (see the column for "Amount of MMA in copolymer" in Table 3). Then, a polymer blend body was prepared in the

TABLE 2

| Example No. | Composition for polymerization for polymer blend | | | Properties of polymer blend body | | Properties of soft film after removal of non-fixed hard polymer | | | | | | |
|---|---|---|---|---|---|---|---|---|---|---|---|---|
| | MMA (g) | DSH (mg) | V-65 (mg) | Nature | Machinability | DS | TP | TN | OP | NP | EG | Fixed MMA (mol %) |
| 11 | 20 | 7.5 | 79 | HW | Good | Good | Good | 0.169 | 41.5 | 410 | 176 | 38.3 |
| 12 | 20 | 13 | 79 | HW | Good | Good | Good | 0.172 | 41.7 | 356 | 165 | 30.0 |
| 13 | 20 | 23 | 79 | HW | Good | Good | Good | 0.170 | 44.2 | 168 | 182 | 7.8 |
| 14 | 20 | 36 | 79 | HW | Good | Good | Good | 0.173 | 43.0 | 140 | 174 | 6.9 |
| Comparative Example 5 | 20 | 65 | 79 | HW | Good | Good | Good | 0.170 | 42.4 | 116 | 164 | 0 |

Note:
MMA: methyl methacrylate
DSH: dodecylmercaptan
V-65: azobisdimethylvaleronitrile
DS: Dimensional stability
TP: Transparency
TN: Thickness (mm)

Figure 2:
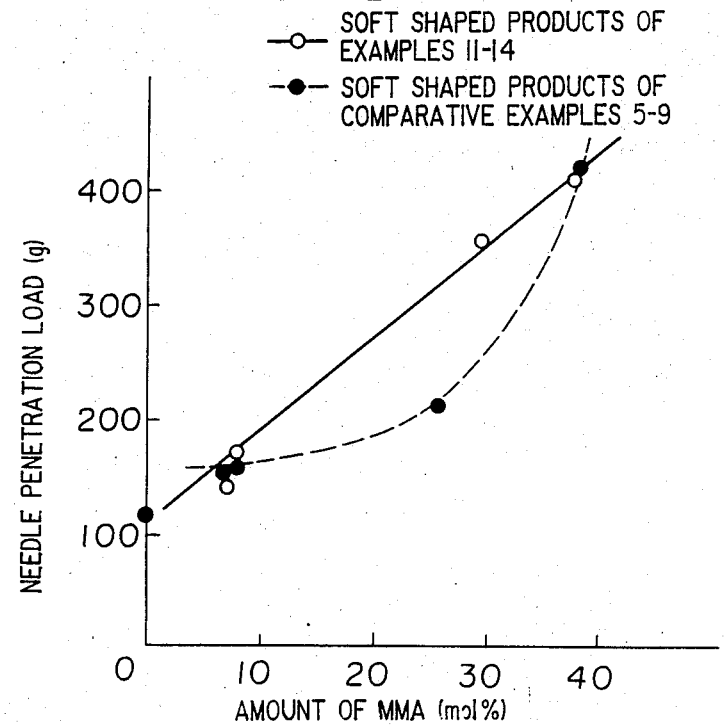
FIG. 2 is a graph obtained by plotting the needle penetration loads of the soft shaped products obtained in the Examples and Comparative Examples against the amounts of MMA fixed in the shaped products.

OP: Oxygen permeability coefficient $\left( \times 10^{11} \frac{cm^3(STP) \cdot cm}{cm^2 \cdot sec \cdot mmHg} \right)$ NP: Needle penetration load (g)
EG: Elongation (%)
HW: Hard and slightly turbit with white The relation between the amount of the fixed MMA and the oxygen permeability coefficient and the relation between the amount of the fixed MMA and the needle penetration load are shown in FIGS. 1 and 2, respectively.

From the above results, it is evident that the products of Examples 11 to 14 and Comparative Example 5 all show excellent oxygen permeability. However, the product of Comparative Example 1 wherein polymethyl methacrylate was not fixed, had a low needle penetration strength.

same manner as in Examples 11 to 14 except that a soft material cut out in a length of 15 mm from the cylindrical shaped soft copolymer material thus obtained was put into a cylindrical glass container having an inner diameter of about 22 mm containing a solution of a mixture prepared to contain a large amount of dodecylmercaptan so as not to fix polymethyl methacrylate in the soft copolymer material as shown in Table 3. Then, the properties of the soft film after the removal of the hard polymer were measured. The results are shown in Table 3.

TABLE 3

| Comparative Example No. | Amount of MMA in copolymer (mol %) | Composition for polymerization for polymer blend | | | Properties of soft film after removal of hard polymer | | | |
|---|---|---|---|---|---|---|---|---|
| | | MMA (g) | DSH (mg) | V-65 (mg) | OP | NP | EG | Thickness (mm) |
| 6 | 38.3 | 20 | 240 | 79 | 15.9 | 420 | 185 | 0.179 |
| 7 | 25.9 | 20 | 240 | 79 | 23.9 | 210 | 153 | 0.180 |
| 8 | 7.7 | 20 | 240 | 79 | 39.5 | 154 | 164 | 0.174 |
| 9 | 6.9 | 20 | 240 | 79 | 39.0 | 148 | 163 | 0.184 |
| 10 | 0 | 20 | 240 | 79 | 42.4 | 116 | 164 | 0.170 |

Note:
MMA: methyl methacrylate
DSH: dodecylmercaptan
V-65: azobisdimethylvaleronitrile OP: Oxygen permeability coefficient $\left( \times 10^{11} \frac{cm^3(STP) \cdot cm}{cm^2 \cdot sec \cdot mmHg} \right)$ NP: Needle penetration load (g)
EG: Elongation (%)

COMPARATIVE EXAMPLES 6 to 10

In order to compare the present invention with the conventional copolymerization method, a cylindrical shaped soft copolymer material was prepared in the same manner as in Examples 11 to 14 by using the same proportion of the cross-linking agent, the same proportion of the initiator and the same polymerization condition as used in the preparation of the above-mentioned soft lens material except that the required amounts of n-butyl acrylate monomer and methyl methacrylate monomer are mixed so that they correspond to the The relation of the amount of MMA in the copolymer and the oxygen permeability coefficient and the relation between the amount of MMA in the copolymer and the needle penetration load are shown in FIGS. 1 and 2, respectively.

It is evident from the above results that if the amount of methyl methacrylate in the copolymer is simply increased to increase the strength, the oxygen permeability coefficient tends to decrease.

EXAMPLE 15

A mixture comprising 98.8 mol parts of n-butyl acrylate, 1.2 mol parts of ethylene glycol dimethacrylate and 0.05 mol part of 2,2'-azobis(2,4-dimethylvaleronitrile) was deaerated, then flushed with nitrogen and introduced into a cylindrical glass container having an inner diameter of 15.4 mm. Nitrogen gas was filled in the container, and the container was closed with a stopper. Polymerization was conducted at 30° C. for 24 hours. Then, the temperature was gradually raised, and polymerization was conducted at 50° C. for 5 hours, at 80° C. for 3 hours and at 100° C. for 2 hours to obtain a soft lens material. The soft lens material thus obtained was elastic at room temperature and transparent.

Then, a solution prepared by uniformly mixing 97.654 parts of methyl methacrylate, 2.072 parts of carbon tetrabromide, 0.257 part of α,α'-azobisisobutyronitrile and 0.017 part of 1,1-diphenyl-2-picrylhydrazyl, was deaerated, then flushed with nitrogen and introduced into a cylindrical glass container having an inner diameter of 25.4 mm. Then, 20 parts of a soft lens material cut out in a length of 11 cm from the cylindrical shaped soft lens material obtained above, was immersed in the solution of the mixture, and nitrogen gas was filled in the container. Then, the container was closed with a stopper. At that time, the solution of the mixture was dark purple. Then, the container was left in a constant temperature water tank at 30° C. for 60 hours, whereupon the color of the solution was purple red, and the soft lens material reached completely the equilibrium state in swelling. During this period, an indication of polymerization was not recognized. Polymerization was conducted at 30° C. for 3 days. Then, the temperature was gradually raised, and polymerization was conducted at 40° C. for 24 hours, at 50° C. for 15 hours, at 60° C. for 3 hours, at 70° C. for 2 hours, at 80° C. for 1 hour and at 100° C. for 30 minutes. The polymer blend body thereby obtained had an orange yellow color and was slightly turbid with white.

The polymer blend body thus obtained was machined and polished into a contact lens shape at room temperature under a usual environmental atmosphere, whereby the machining and polishing could readily be accomplished since the polymer blend body was sufficiently hard.

The shaped body thus obtained was immersed and permitted to swell in chloroform for 5 days to remove polymethyl methacrylate as the hard polymer component and dried to obtain a colorless transparent contact lens with an adequately polished surface and having the same elasticity as the soft lens material used as the starting material.

The shrinkage was 69.7% as calculated in accordance with the following equation, and every portion of the polymer blend showed the exactly the same shrinkage, thus indicating high quality.

$$\text{Shrinkage (\%)} = \frac{\text{Diameter of contact lens after the removal of the hard polymer}}{\text{Diameter of contact lens shaped from the polymer blend body}} \times 100$$

COMPARATIVE EXAMPLE 11

A polymer blend body was prepared in the same manner as in Example 15 except that 1,1-diphenyl-2-picrylhydrazyl was omitted and processed into a contact lens. The machinability and the polishing properties were good. However, the shrinkage of the contact lens after the removal of the hard polymer varied at levels of 69.6, 70.4 and 69.4 at the upper portion, the middle portion and the lower portion of the polymer blend body, such being undesirable.

EXAMPLES 16 to 19

A polymer blend body was prepared in the same manner as in Example 15 except that the type of the starting monomer for the soft lens material, the chain transfer agent, the polymerization inhibitor and the solvent for extraction of the hard polymer were changed as shown in Table 4 and processed into a contact lens. The machinability, the uniformity in shrinkage and the removability of the hard polymer are shown in Table 4. When VDZ was used as the polymerization inhibitor, the color of the system was green during the induction period. As the polymerization proceeded, the color faded and finally became pale yellow.

COMPARATIVE EXAMPLES 12 to 15

A polymer blend body was prepared in the same manner as in Examples 16 to 19 except that the polymerization inhibitor used in Examples 16 to 19 was omitted, and processed into a contact lens. The machinability, the uniformity in shrinkage and the removability of the hard polymer are shown in Table 4.

TABLE 4

|  | A | B | C | D | E | F | G | H | I |
|---|---|---|---|---|---|---|---|---|---|
| Example |  |  |  |  |  |  |  |  |  |
| 15 | nBA | MMA | AIBN | CBr$_4$ | DPPH | CHCl$_3$ | Good | ◎ | Excellent without breakage |
| 16 | EA | MMA | AIBN | CBr$_4$ | DPPH | CHCl$_3$ | " | ◎ | Excellent without breakage |
| 17 | 2MEA | MMA | AIBN | CBr$_4$ | DPPH | CHCl$_3$ | " | ○ | Excellent without breakage |
| 18 | 8FPA | MMA | AIBN | DSH | VDZ | AcOET | " | ◎ | Execellent without breakage |
| 19 | nBA/[(1)] 8FPA | MMA | AIBN | CBr$_4$ | DPPH | CHCl$_3$ | " | ◎ | Execellent without breakage |
| Comparative Example |  |  |  |  |  |  |  |  |  |
| 11 | nBA | MMA | AIBN | CBr$_4$ | — | CHCl$_3$ | " | Δ | Excellent without breakage |
| 12 | EA | MMA | AIBN | CBr$_4$ | — | CHCl$_3$ | " | Δ | Peripheral portion tends to break |
| 13 | 2MEA | MMA | AIBN | CBr$_4$ | — | CHCl$_3$ | Poor at | — | Highly breakable |

TABLE 4-continued

| | A | B | C | D | E | F | G | H | I |
|---|---|---|---|---|---|---|---|---|---|
| 14 | 8FPA | MMA | AIBN | DSH | — | AcOEt | Poor at the center | — | " |
| 15 | nBA/ 8FPA | MMA | AIBN | CBr$_4$ | — | CHCl$_3$ | Poor at the center | — | " |

Notes:
nBA: n-butyl acrylate
EA: ethyl acrylate
2MEA: 2-methoxyethyl acrylate
8FPA: 1H,1H,5H—octafluoropentyl acrylate
MMA: methyl methacrylate
AIBN: α,α'-azobisisobutyronitrile
CBr$_4$: carbon tetrabromide
DSH: dodecylmercaptan
DPPH: 1,1-diphenyl-2-picrylhydrazyl
VDZ: 1,3,5-triphenylverdazyl
CHCl$_3$: chloroform
AcOET: ethyl acetate
(1) nBA: 8FPA = 50:50 (mol ratio)
○: Uniform throughout the upper, middle and lower portions
Δ: Slightly varies among the upper, middle and lower portions
A: Starting monomer for soft lens material
B: Monomer for blend polymer
C: Polymerization initiator for blend polymer
D: Chain transfer agent
E: Polymerization inhibitor
F: Solvent for extraction
G: Formability
H: Uniformity in shrinkage
I: Removability of hard polymer

EXAMPLE 20

A mixture comprising 99.4 mol parts of 2-methoxyethyl acrylate, 0.6 mol part of ethylene glycol dimethacrylate and 0.032 mol part of α,α'-azobisisobutyronitrile was deaerated, then flushed with nitrogen and introduced into a cylindrical glass container having an inner diameter of 15.4 mm. Then, nitrogen gas was filled in the container, and the container was closed with a stopper. Polymerization was conducted at 30° C. for 48 hours. Then, the temperature was gradually raised, and polymerization was conducted at 50° C. for 5 hours, at 80° C. for 3 hours and at 100° C. for 2 hours to obtain a cross-linked soft lens material composed of 2-methoxyethyl acrylate. The material thus obtained was elastic at room temperature and transparent.

Then, a solution prepared by uniformly mixing 97.654 parts of methyl methacrylate, 2.072 parts of carbon tetrabromide, 0.257 part of α,α'-azobisisobutyroni and 0.017 part of 1,1-diphenyl-2-picrylhydrazyl was deaerated, then flushed with nitrogen and introduced into a cylindrical glass container having an inner diameter of 25.4 mm. Then, 20 parts of a soft lens material cut out from the cylindrical shaped soft lens material obtained above and composed of 2-methoxyethyl acrylate was immersed in the solution of the mixture. Then, nitrogen gas was filled in the container, and the container was closed with a stopper. At that time, the solution of the mixture was dark purple. Then, the container was left in a constant temperature water tank at 30° C. for 60 hours. The color of the solution was then purple red, and the soft lens material reached completely the equilibrium state in swelling. Polymerization was conducted at 30° C. for 3 days. Then, the temperature was gradually raised, and polymerization was conducted at 40° C. for 24 hours, at 50° C. for 15 hours, at 60° C. for 3 hours, at 70° C. for 2 hours, at 80° C. for 1 hour and at 100° C. for 30 minutes. A polymer blend body thus obtained was orange yellow and transparent.

The polymer blend body thus obtained was machined and polished into a contact lens at room temperature under a usual environmental atmosphere, whereby the machining and polishing were readily conducted.

The shaped product thus obtained was immersed and permitted to swell in chloroform for 5 days to remove polymethyl methacrylate as the hard polymer component and dried to obtain a colorless, transparent soft contact lens with its surface sufficiently polished and having the same elasticity as the soft lens material used as the starting material.

The soft contact lens thus obtained was tested for the ability to prevent deposition of ocular lipids and for the affinity to tear in accordance with Test Methods 1, 2 and 3 as described below.

Test Method 1

A material which will not swell in oleic acid as a component of ocular lipids has low affinity to ocular lipids and thus is superior in the ability to prevent deposition of ocular lipids since ocular lipids hardly deposit on the surface of such a material or hardly penetrate into the interior. Therefore, the diameter of the soft contact lens is measured in water at 35° C. Then, the sample is immersed in about 6 cc of oleic acid and kept at 35° C. for 24 hours, whereupon the diameter of the sample is measured. Then, the swelling rate in oleic acid is calculated in accordance with the following equation.

$$\text{Swelling rate in oleic acid} = \frac{\text{Diameter of soft contact lens upon expiration of 24 hours in oleic acid}}{\text{Diameter of soft contact lens prior to immersion in oleic acid}}$$

Test Method 2

To 100 ml of water at 70° C., 1 g of a mixture of lipids having the following composition are added and stirred for emulsification and mixing. While maintaining the mixture at 70° C., the soft contact lens obtained in an Example is put in the mixture and stirred for about 20 minutes. After expiration of a prescribed period of time, the soft contact lens is withdrawn, then cooled to room temperature and washed with water. Then, it is washed with finger tips by means of Meniclean (tradename), and finally washed with Meniconpuff (tradename) wherein Meniclean is employed. Then, the deformation of the soft contact lens and the presence or absence of white turbidity are examined. This test method is conducted under a more severe condition under heating than Test Method 1. Thus, a material free from deformation or white turbidity has a low affinity to ocular lipids and is superior in the ability to prevent deposition of ocular lipids.

Mixture of lipids:
| | |
|---|---|
| tripalmitin | 1.818 g |
| cetyl alcohol | 0.606 g |
| palmitic acid | 1.212 g |
| oleic acid | 1.212 g |
| linolic acid | 1.212 g |
| cholesterol | 0.606 g |
| cholesterol palmitate | 0.606 g |
| lecithin | 0.910 g |

Test Method 3

The lens obtained in an Example is actually put on an eye and worn for about 2 hours, whereupon the ability to prevent deposition of ocular lipids and the affinity to tear are examined.

With the soft contact lens obtained in Example 20, the swelling rate was 1.0 in Test Method 1, no deformation or no white turbidity was observed in Test Method 2, and no fogging due to the deposition of ocular lipids or no repellency of tear on the lens surface was observed in Test Method 3. Thus, the soft contact lens was found to have excellent ability to prevent deposition of ocular lipids and affinity to tear.

COMPARATIVE EXAMPLE 16

A soft contact lens was prepared in the same manner as in Example 20 except that the soft lens material was prepared from 63.3 mol parts of n-butyl acrylate, 31.7 mol parts of n-butyl methacrylate and 0.6 mol part of ethylene glycol dimethacrylate. The contact lens was tested by the Test Methods 1 and 2, whereby the swelling rate was 1.20, and a deformation and white turbidity were observed, thus indicating a poor ability to prevent deposition of ocular lipids. The soft contact lens was put on an eye in the same manner as in Example 20, whereupon in a few minutes ocular lipids started to deposit, and fogging of the eye sight started.

EXAMPLE 21

A soft contact lens was prepared in the same manner as in Example 20 except that the monomer for the soft lens material was changed to 1H,1H,5H-octafluoropentyl acrylate and the solvent for extraction was changed to ethyl acetate. The ability to prevent deposition of ocular lipids and the affinity to eyewater of the soft contact lens thus obtained were examined in the same manner as in Example 20 and were found to be excellent.

The results of Examples 20 and 21 and Comparative Example 16 are shown in Table 5.

TABLE 5

| | Monomer | Test method 1 (swelling rate in oleic acid) | Test method 2 Deformation | White turbidity | Test method 3 Wearing results |
|---|---|---|---|---|---|
| Example 20 | 2MEA | 1.0 | Nil | Nil | Uniformly wetted with tear and no fogging resulted |
| 21 | 8FPA | 1.0 | Nil | Nil | " |
| Comparative Example 16 | nBA/ nBMA[1] | 1.2 | Observed | Observed | In a few minutes, deposition of ocular lidis and fogging of the eye sight started |

Notes:
2MEA: 2-methoxyethyl acrylate
8FPA: 1H,1H,5H-octafluoropentyl acrylate
nBA: n-butyl acrylate
nBMA: n-butyl methacrylate
[1]nBA/nBMA = 68.3 mol parts/31.7 mol parts As described in the foregoing, according to the method of the present invention, machining of a soft lens material which used to be difficult can readily and highly precisely be conducted without requiring a large installation or high cost.

A number of shaped products can be prepared from a small amount of the soft lens material.

When a very small shaped product is desired, the machining can be conducted in an enlarged size in the swelled state, and accordingly the machining can be carried out with high precision.

Further, when a plastic such as polymethyl methacrylate known as a material for a hard contact lens in the field of contact lenses is subjected to machining, the material is likely to break i.e. undergo chipping or cracking during the machining due to the brittleness specific to the plastic. Whereas, the polymer blend body obtained by the present invention has a nature of a plastic reinforced by a soft material and thus has excellent impact resistance, whereby the problem of brittleness specific to the plastic material can be overcome. Thus, chipping or cracking during the machining can be avoided.

In a preferred embodiment, the soft lens material can be reinforced by a hard polymer fixed in the soft lens material, whereby it is possible to obtain a lens material having an improved mechanical strength without impairing the softness or oxygen permeability specific to the soft lens material. The soft ocular lens material reinforced by the fixed had polymer of the present invention is useful for ocular lenses such as contact lenses, intraocular lenses or artificial cornea, and it is particularly suitable for soft contact lenses since it presents a comfortable feeling to the wearer and it has a proper mechanical strength.

In a preferred embodiment of the method of the present invention, a polymerization inhibitor is added to a monomer solution for the hard polymer to ensure uniform penetration of the monomer and other reagents, e.g. initiator, chain transfer agent into the soft lens material and hence uniform distribution of the hard polymer in the polymer blend body.

In another preferred embodiment, the monomer for the soft lens material is selected so that the resulting soft lens material has excellent ability to prevent deposition of ocular lipids and affinity to tear.

Furthermore, according to the method of the present invention, a composite contact lens known in the field of contact lenses to have a hard center and a soft periphery can readily be machined.

We claim:

1. A method for preparing a soft ocular lens, which comprises machining a machinably hard polymer blend body composed essentially of a soft lens material and a hard polymer into an ocular lens shape, and removing completely the hard polymer or the non-fixed portion of the hard polymer from the shaped product.

2. The method according to claim 1, wherein the polymer blend body is prepared by impregnating into the soft lens material a monomer for the hard polymer, followed by polymerization of the monomer.

3. The method according to claim 1, wherein the polymer blend body is prepared by impregnating into the soft lens material a solution of a monomer for the hard polymer having a chain transfer agent added thereto, followed by polymerization of the monomer, and the hard polymer not fixed in the polymer blend body is removed from the shaped product to obtain a soft ocular lens of a polymer alloy consisting essentially of the soft lens material and the hard polymer fixed in the soft lens material.

4. The method according to claim 3, wherein the chain transfer agent is added to the monomer solution in an amount effective to fix the hard polymer in the soft lens material in an amount effective for the reinforcement of the soft lens material without impairing the oxygen permeability thereof.

5. The method according to claim 1, wherein the polymer blend body is prepared by impregnating into the soft lens material a monomer solution comprising a monomer for the hard polymer, a radical polymerization initiator, a chain transfer agent and a polymerization inhibitor.

6. The method according to claim 5, wherein the monomer solution comprises 100 mol parts of the monomer, from 0.01 to 0.5 mol part of the polymerization initiator, not more than 10 mol parts of the chain transfer agent and from 0.015 to 0.05 equivalent, relative to the polymerization initiator, of the polymerization inhibitor.

7. The method according to claim 5, wherein the soft lens material is prepared by polymerizing a monomer material composed essentially of one or more monomers selected from the group consisting of compounds of the formula:

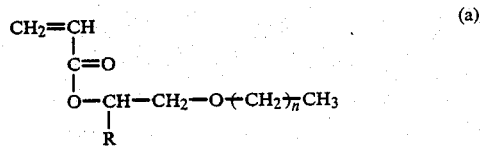

wherein R is —H or —CH$_3$, n is 0 or 1, provided that when n is 1, R is —H, and compounds of the formula:

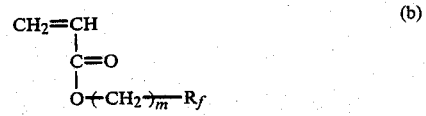

wherein R$_f$ is —C$_a$H$_b$F$_{2a+1-b}$ wherein a is an integer of from 1 to 7 and b is 0 or 1, and m is an integer of from 0 to 2.

8. The method according to claim 5, wherein the soft lens material is prepared by polymerizing a monomer material composed essentially of one or more monomers selected from the group consisting of 2-methoxyethyl acrylate, 2-ethoxyethyl acrylate, 1-methyl-2-methoxyethyl acrylate, 1H,1H-trifluoroethyl acrylate, 1H,1H-pentafluoropropyl acrylate, 1H,1H-heptafluorobutyl acrylate, 1H,1H,3H-hexfluorobutyl acrylate, 1H,1H-nonafluoropentyl acrylate, 1H,1H,5H-octafluoropentyl acrylate, 1H,1H-undecafluorohexyl acrylate, 1H,1H-tridecafluorohexyl acrylate and 1,1,1,3,3,3-hexafluoro-2-propyl acrylate.

* * * * *